April 15, 1958  R. W. BARTHEL  2,831,089
CONTROL APPARATUS
Filed Dec. 19, 1956

INVENTOR.
ROY W. BARTHEL
BY Robert S. Craig
ATTORNEY

United States Patent Office 2,831,089
Patented Apr. 15, 1958

2,831,089
CONTROL APPARATUS

Roy W. Barthel, Minneapolis, Minn., assignor to Minneapolis-Honeywell Regulator Company, Minneapolis, Minn., a corporation of Delaware Application December 19, 1956, Serial No. 629,279

6 Claims. (Cl. 200—138)

The present invention is concerned with an improved temperature controller, in particular, a temperature controller having an enclosed switch assembly in which the switch is actuated or circuit is made upon the rotation of a screw by the temperature responsive device.

In thermostats for use particularly with electrical heating loads the circuit switching structure can be of the slow operating type. In controlling electric heating loads which are substantially pure resistance loads the contacts of the switch for controlling the circuit can move together quite slowly and yet not result in the generally known damaging results which take place when slow operating switches are used to control inductive loads.

The present invention is an improved "slow make and break" switch operating device particularly for use with pure resistance electrical loads such as in electric heating installations. The switch and operating structure thereof is quite simple and inexpensive to manufacture. It essentially is a screw which is threadably received in an insulated block so that by rotation of the screw by a temperature responsive device an associated electrical circuit is made and broken.

It is therefore an object of the present invention to provide an improved temperature controller.

It is another object of the present invention to provide in a temperature controller an improved switch operating mechanism which is relatively simple and inexpensive to manufacture.

Still another object of the present invention is to provide an improved thermostat having an enclosed switch comprising a screw which is rotated by the temperature responsive device.

And still another object of the present invention is to provide an improved switch.

Figure 1:
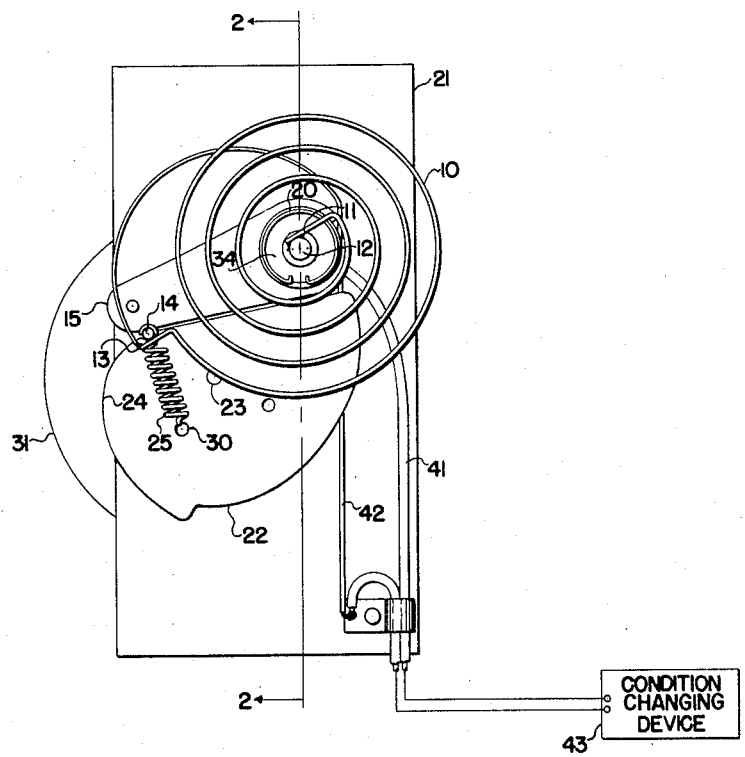

These and other objects will become apparent upon the study of the specification and drawings of which Figure 1 is a rear view of the thermostat showing the bimetal and the cam for adjusting the control point of the thermostat.

Figure 2:
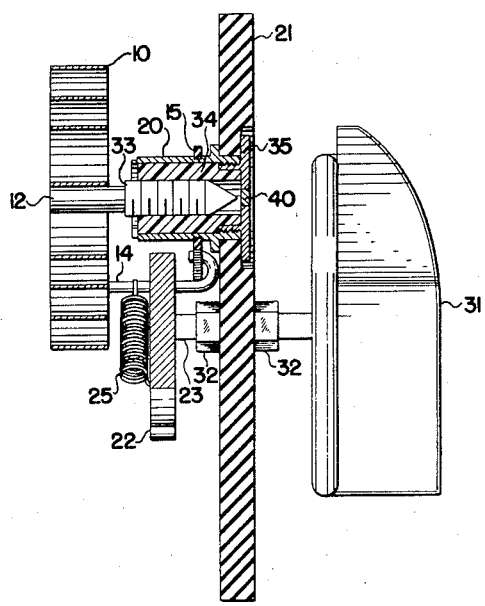

Figure 2 is a side sectional view taken on line 2—2 on Figure 1.

Referring to Figure 1, the temperature controller or thermostat has a spiral type bimetal 10 having its inner end 11 connected to a shaft 12. The outer extremity 13 of the bimetal is fastened to an adjustable support bracket 14 which upon movement adjusts the control point. The support bracket 14 is connected to the outer extremity of a lever 15 made of insulating material. Lever 15 is journaled at its opposite end about the cylindrical casing 20 which is attached to a base 21 and projects perpendicular thereto. Lever 15 is adapted to move about casing 20 in a plane parallel to base 21. Lever 15 is split at the opposite end and is sufficiently flexible so that it can be snapped in an annular groove on casing 20.

A cam 22, engaging bracket 14 along the upper edge of the cam surface, can be rotated about a shaft 23, as shown in Figure 2, to position extremity 13 of the bimetal and thus adjust the control point of the thermostat. Bracket 14 is held in position against the surface 24 of the cam by a spring 25 which is connected between bracket 14 and a point 30 on the cam. As shown bracket 14 is in a notch at one end of the active adjusting range of the cam.

Referring to Figure 2, shaft 23 is shown passing through base 21 at right angles thereto and having a control or adjusting knob 31 connected at its opposite extremity. The shaft is journaled on a bearing 32.

Referring to Figure 2, the extremity of shaft 12 opposite that end connected to bimetal 10 has an enlarged portion 33 in the form of a screw. Screw 33 is threadably received in an insulating bushing 34 contained inside of casing 20. The screw has a silver tip forming the electrical contact. The bushing may be Teflon permitting a close fit for screw 33 and yet a minimum friction. To reduce any possible "back lash" bimetal 10 biases screw 33 to the left as shown in Fig. 2. Bushing 34 provides electrical insulation between screw 33 and casing 20. Threaded into one end of casing 20 is a cap 35 which forms an end plate for the casing. A center portion of cap 35 has an insert 40 of metal especially adapted for contacts so that upon the forward movement of screw 33 into the bushing 34 the end of the screw will contact insert 40 to close an electrical circuit connected between screw 33 and casing 20. The switch is calibrated by rotating casing 20 with respect to base 21.

As shown in Figure 1 a wire 41 is connected to casing 20 and a wire 42, which is somewhat smaller than wire 41 to be more flexible and provide less mechanical resistance, is connected to bracket 14 and thus extremity 13 of the bimetal. Wires 41 and 42 are shown connected to a condition changing device 43 which might be any sort of device which would be operated when the circuit between the mentioned wires is closed.

Operation

As shown in Figure 2 the thermostat contact, that is the electrical circuit between screw 33 and casing 20, is open. By the rotation of cam 22 in a clockwise direction, looking at the back of the thermostat in Figure 1, lever 15 is raised as the bracket 14 rides on the surface 24 of the cam. Raising of bracket 14 and thus the extremity 13 of the bimetal rotates shaft 12 in a clockwise direction to move the screw 33 inward toward the insert 40 to make the electrical contact. Thus rotation of the cam in the counterclockwise direction as mentioned raises the control point of the thermostat. With the setting of the thermostat as shown let us assume that the temperature decreases. Since extremity 13 of the bimetal is held fixed and the bimetal would tend to uncurl shaft 12 would rotate in a clockwise direction. The screw would engage the insert portion 40 to make the electrical circuit. Assuming that the condition changing device was an electrical heater for heating the space in which the bimetal 10 was located, as soon as the space temperature increased the bimetal would move the shaft 12 in a counterclockwise direction and the electrical circuit between screw 33 and casing 20 would break.

The switch contacts, that is, the tip of screw 33 and insert 40, are enclosed. This reduces the contact dirt which can result in contact resistance and switch failure. While contact welding is common with "slow make" electric contacts as in this invention, the rotational movement of screw 33 not only provides a tension force to break any contact weld but a shear force is provided. As the screw rotates to open the contacts a high force is available to shear any existing contact weld. This improves the dependability of the switch.

While modifications of the invention are obvious to one skilled in the art, it is intended that the scope of the present invention be limited by the appended claims.

I claim:

1. In a thermostat, a spiral type bimetal temperature responsive device, one end of said bimetal being attached to an adjustable mount, an electric conducting screw connected at one end thereof to the other end of said bimetal so that upon a change in the temperature of said bimetal temperature responsive device said screw is rotated, an insulating support having a threaded hole for receiving said screw, an electric conducting contact at one end of said hole whereby upon rotation of said screw in a forward direction an electrical circuit exists between said screw and said contact, and means for manually adjusting said amount whereby the temperature at which said screw engages said contact is selected.

2. In a temperature controller, a bimetallic device having an output shaft which rotates a predetermined amount upon a predetermined change in temperature, an electric conducting screw, a mount having an insulating portion with a threaded hole adapted to receive said screw, means for connecting said screw to said output shaft, and contact means mounted at one end of said hole adapted to form a closed circuit when said screw is advanced into said hole a predetermined amount, said insulating portion forming a seal to prevent foreign material from entering the hole wherein the contact is made.

3. In a thermostat, a screw having an end connected into an electrical circuit, a sealing bushing receiving said screw, said bushing being made of insulating material, a conducting surface adapted to be engaged by said end, said conducting surface being connected into said circuit, an enclosure including said bushing for enclosing said conducting surface and said end and temperature responsive means connected to said screw to provide rotatable movement thereof upon a change in space temperature.

4. In a control device, an insulating member having a threaded hole therein, a metallic member fastened to said block at one end of said hole, a screw threadably received in said hole so that upon rotation of said screw in a predetermined direction, it will engage said metallic member, an enclosure including said bushing for enclosing a portion of said screw and said member engaging, condition responsive means, and means connecting said responsive means to rotate said member.

5. In a thermostat, a temperature responsive device having an output shaft providing rotatable movement thereof upon a change in temperature, said shaft having a threaded portion, a mount having a threaded hole therein receiving said threaded portion of said shaft, said mount forming an insulation bushing, a seal, and a low friction bearing and switch means associated with said shaft, said switch means being closed when said shaft moves into said hole.

6. In a switch, an electric conducting screw, an insulating bushing having a hole therein for receiving said screw, and an electric conducting cover for closing one end of said hole forming an enclosure between said screw and said cover whereby upon said screw engaging said cover an electric circuit is closed.

References Cited in the file of this patent

UNITED STATES PATENTS

| | | |
|---|---|---|
| 1,894,843 | Appelberg et al. | Jan. 17, 1933 |
| 2,636,108 | Mancini | Apr. 21, 1953 |
| 2,674,674 | Rietschel | Apr. 6, 1954 |